Oct. 19, 1965  W. WERNER ET AL  3,212,485
METHOD AND APPARATUS FOR OPERATING INTERNAL
COMBUSTION ENGINES
Filed Dec. 1, 1960
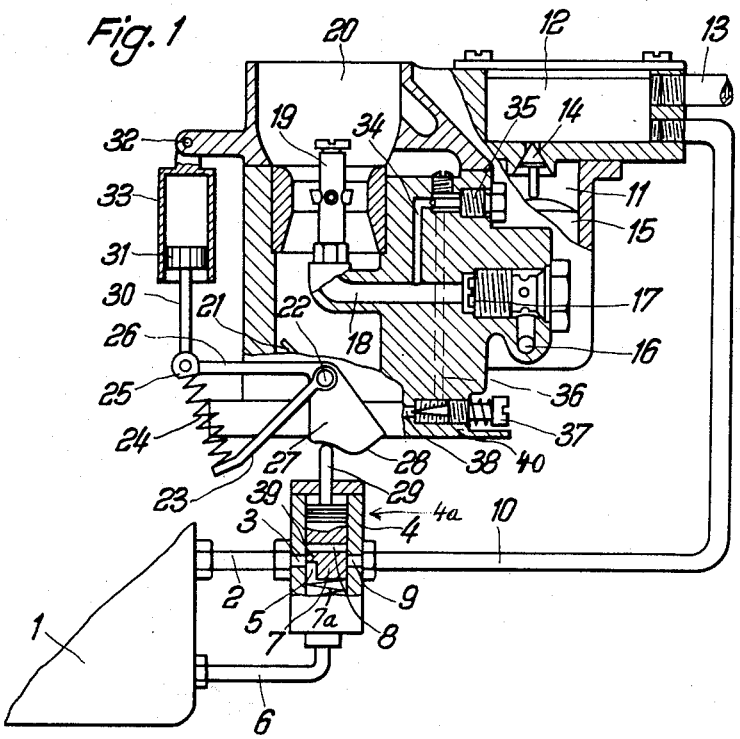
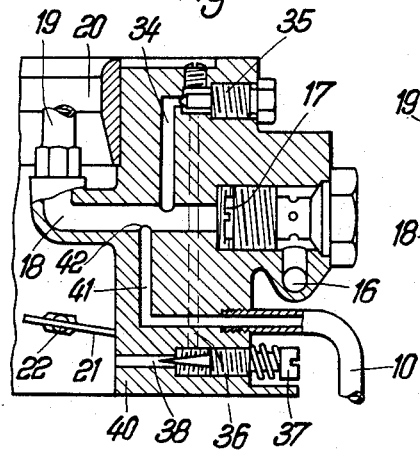
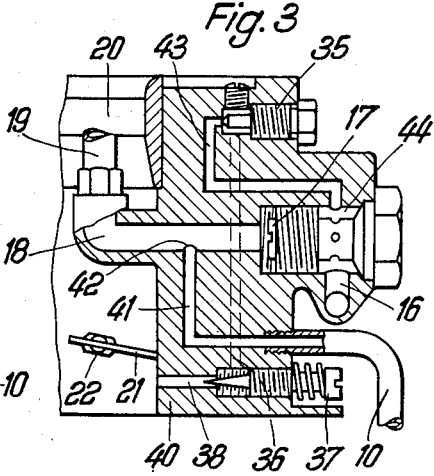

United States Patent Office 3,212,485
Patented Oct. 19, 1965

1

3,212,485
METHOD AND APPARATUS FOR OPERATING
INTERNAL COMBUSTION ENGINES
William Werner and Oskar Siebler, Dusseldorf-Kaiser-
werth, and Ernst Alt and Bernhard Büchner, Ingolstadt,
Germany, assignors to Auto Union G.m.b.H., Ingol-
stadt, Germany
Filed Dec. 1, 1960, Ser. No. 178,519
7 Claims. (Cl. 123—119)

The present invention relates to a method and apparatus for operating a two-cycle internal combustion engine in which the mixture ratio of oil to gasoline is regulated temporarily at no load in the ratio of 1-∞ to the usual ratio at full load during which oil is conducted into the suction system of the carburetor, and is a continuation-in-part of our copending application Serial No. 23,809, filed April 4, 1960, now Patent No. 3,114,356.

In a known engine structure, a closed lubrication system consisting of a lubricant reservoir, a suction conduit, a lubricant pump, a pressure conduit and a feed back conduit which is connected to the pressure conduit and leads back into the lubricant reservoir, a control member coupled with the output control member of the engine is arranged at the transition point of the pressure conduit to the feed back conduit, the control member admitting that portion of the supplied lubricant necessary for lubricating the engine into the conduit leading to the suction line of the engine.

The introduction of a quantity of lubricant into the conduit leading to the suction line of the engine has the disadvantage that, particularly in cold weather when the oil is very viscous and flows only slowly so that it mixes only with difficulty or not at all with the air in the suction line of the engine and is not fed quickly enough to the lubricating points, the engine may sustain damage due to a lack of lubricating oil.

It is therefore an object of the present invention to provide a lubricating arrangement which obviates this drawback and which effects a proper lubrication at all operating temperatures of the engine.

This invention is based on the above-identified patent application disclosing an arrangement for operating two-cycle internal combustion engines and is an improvement thereof. The novelty of the present invention resides in an arrangement wherein oil is added to the gasoline prior to mixing it with the air being sucked into the carburetor. The viscosity of the gasoline and oil mixture thus produced is not sensitive to the temperature differences which may arise.

According to a special arrangement of the present invention, the lubricating oil is introduced into the float housing. This presents the advantage that the inertia of the control arrangement is diminished particularly when the oil conduit enters this housing in the proximity of the needle valve of the float housing.

According to a further arrangement of the subject matter of this invention, the lubricating oil can also be fed into a mixing chamber located ahead of the float housing. The intensive mixing of the oil with the gasoline and the relatively uniform introduction of the oil is a particular advantage of this arrangement. With this type of system, only a mixture which is predetermined by the position of a throttle valve or governor piston is introduced into the engine and eliminates haphazard or arbitrary operation. However such a system still has an inherent control inertia because a mixture of gasoline and oil which is present in the float housing and in the nozzle conduit and which corresponds due to a different throttle

2 valve or governor piston position to a different mixture ratio must first be used up before a mixture can be introduced which corresponds precisely to the existing engine load.

According to the present invention, a particular advantage is obtained if the lubricating oil is introduced behind the main fuel supply nozzle. In this arrangement, the control inertia is eliminated for all practical purposes because the oil is mixed in a very small space and at a relatively high flowing speed of the fuel so that even in the case of rapid load variations a mixing ratio of gasoline and oil corresponding at all times to the existing position of the governor piston or throttle valve is introduced into the engine. A still further improvement can be achieved if the conduit for the gasoline used at no load is introduced ahead of the main nozzle. This provides a simple arrangement in which only gasoline is fed to the engine at no load so that a smoking during this period or a concentration of excess lubricating oil in the exhaust pipe is prevented, while the mixing ratio is variable in each instance in the different partial load regions.

The governor piston is preferably arranged in the carburetor housing. It is also desirable to actuate the governor piston by means of a cam member fixed to the throttle valve shaft so that a very precise regulation can be realized independent of any play in associated linkage structure. A cover member which is flanged to the throttle valve housing provides an easy mounting of the cam member and protects it against the accumulation of dirt. In order to prevent that with each brief pressure of the accelerator a variation of the mixture and thus an excessive lubrication take place, a delayed action pump may be associated with the cam disk and a spring means may be arranged between a cam arm and a suitable lever arm. In this type of construction the cam arm and the lever arm are preferably arranged coaxially. An appropriate delayed action pump may consist of an air cylinder and a piston member and the usual connecting rod may be eliminated by mounting the air cylinder rotatably.

Additional features and details of the invention will become apparent from the following description when taken in conjunction with the accompanying drawing in which an embodiment of the invention is shown by way of example only.

In the drawing:
FIGURE 1 is a partial cross-section of the carburetor of this invention.
FIGURE 2 is a detail view showing a modification of the carburetor structure of FIGURE 1, also in cross-section and
FIGURE 3 is a detail view of a further modification of the carburetor structure of FIGURE 1, also in cross-section.

Referring now particularly to the embodiment of FIGURE 1, it may be seen that an oil pump 1 is arranged to supply oil through a conduit 2 and a canal 3 provided in a governor housing 4 to the governor member 4a. In the position shown in this figure the oil flows from canal 3 past a recessed portion 5 in the governor piston 7 through a feed back or return conduit 6 into the lubricating pump 1 or into any suitable lubricant reservoir. Governor piston 7 is provided with a passageway 8 which provides a connection between canal 3 and a canal 9 arranged also in the governor housing as piston 7 moves downwardly. Canal 9 is connected to a conduit 10 which leads into the carburetor housing 40. The lubricating oil may be fed into a float housing 11 or as shown in FIGURE 1 into a mixing chamber 12 located ahead of float housing 11. Mixing chamber 12 has a small volumetric capacity and the oil is mixed in this chamber with the gasoline which is also fed to this chamber by means of a pump (not shown) through a pipe 13. The mixture of gasoline and oil is conducted from the mixing chamber past a float needle valve 14 which is controlled by means of a float member 15 into the float housing 11. From float housing 11 the fuel mixture passes into a conduit 16 and through a main nozzle 17 into a nozzle canal 18 which leads into a mixing tube 19 disposed in a suction line 20. As viewed in FIGURE 1 the air passes downwardly through the suction line and the fuel mixture is combined with this air as it leaves the mixing tube 19. The amount of air which is allowed to pass through the suction line 20 is regulated by means of a throttle valve 21 which is secured to a throttle valve shaft 22. A lever 23 is also secured to the throttle valve shaft and a compression spring 24 is arranged between this lever 23 and a pivot head 25 of a connecting arm 26. Arm 26 is mounted pivotably on throttle valve shaft 22 and is fixedly connected to a cam disk 27. The cam disk 27 is provided with a cam surface 28 which has a centrally raised curved portion and is adapted to actuate a follower pin 29 fixed to piston member 7 of the governor 4a. The piston 7 may be provided with a spring 7a to hold it in engagement with cam 27. A rod 30 fixed to pivot head 25 is connected to a piston 31 which is slidably disposed in an air cylinder 33 mounted pivotably at 32.

Assuming that the throttle valve 21 is opened farther due to pressure on the accelerator (not shown) throttle valve shaft 22 is rotated thereby causing a movement of lever 23 which is fixedly connected to shaft 22. Movement of lever 23 exerts pressure on pivot head 25 through spring 24 to cause both a movement of lever 26 and cam disk 27 and a movement of rod 30 and piston 31 to compress the air in cylinder 33. A quick actuation of throttle valve 21 will cause initially a quicker movement of lever 23 than of lever 26 and will compress spring 24, as the compression of the air in cylinder 33 impedes a quick movement of piston 31. During a progressive actuation of the throttle valve 21 the resistance of the air cushion in cylinder 33 is diminished because the slow motion of piston 31 permits air to bypass the piston to the outside. Under normal conditions therefore lever 23 will move at the same speed as lever 26 and thus actuates piston 7 of the governor 4a through cam 27 and follower pin 29 practically without time delay and as the opening of the throttle valve increases will consequently feed an increasing amount of oil through conduit 10 to the carburetor.

In the position shown in FIGURE 1 the fuel which is fed from float housing 11 through conduit 16, main nozzle 17, nozzle canal 18, no load canal 34, no load nozzle 35, conduit 36 and canal 38 into suction tube 20 is regulated by means of an adjusting screw 37 without introducing any oil through canal 3, passageway 8 and canal 9 into conduit 10 and into the gasoline in mixing chamber 12.

Referring now particularly to the modification shown in FIGURE 2, conduit 10 leads into the carburetor housing 40 and is connected with the nozzle canal 18 through a conduit 41 so that the lubricating oil supplied through conduit 10 is introduced behind main nozzle 17. In nozzle canal 18 the fuel flows at a relatively high speed and a relatively small amount of fuel is present between the outlet 42 of conduit 41 and the end of the fuel column in the mixing tube 19 so that particularly in those regions in which a relatively large quantity of oil is fed to the carburetor the amount of oil which corresponds to the new throttle valve or governor position is supplied practically the moment the load variation takes place. At no load the suction line 20 is fed a gasoline-oil mixture through line 34, no load nozzle 35, line 36, adjustment screw 37, canal 38. As a very small amount of fuel flows through line 34 at no load, a gasoline and oil mixture which corresponds to a different position of the piston of governor 4a is still fed into suction line 20 for a short time after the throttle valve has been closed. Conduit 10 arranged between governor housing 4 and carburetor housing 40 should be made as short as possible. According to a feature of this invention this is obtained by making the governor housing 4 a part of the carburetor housing 40.

Referring now particularly to the modification shown in FIGURE 3, the control inertia for supplying fuel at no load is completely eliminated if the fuel is admitted ahead of main nozzle 17 so that it is fed through a conduit 36, no load nozzle 35, canal 36, adjusting screw 37 and canal 38 into the air suction tube 20. Due to the fact that conduit 41 enters the nozzle canal 18 behind the main nozzle 17 no oil is admitted into chamber 44 so that gasoline only is immediately introduced into the air stream in suction line 20 without any control inertia and a large amount of the smoking of the exhaust installation is thereby eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. Apparatus comprising a carburetor, a fuel supply chamber, a gasoline supply and an oil supply connected to said fuel supply chamber, an air suction line in said carburetor, conduit means in said carburetor for connecting said fuel supply chamber to said air suction line, means for feeding fuel from said gasoline supply and said oil supply through said fuel chamber into said air suction line, air throttling means in said air suction line, support means for said air throttling means, cam means mounted on said support means, governor means connected to said oil supply, said cam means engaging said governor means in response to the operation of said throttling means to regulate the supply of oil to said carburetor.

2. Apparatus as claimed in claim 1 wherein time delay means are connected to said cam means to retard the operation of said governor means in response to rapid actuation of said air throttling means.

3. Apparatus as claimed in claim 1 wherein said governor means comprises a piston member arranged in said carburetor.

4. Apparatus comprising a carburetor housing, a first fuel supply conduit in said carburetor housing, a main fuel supply nozzle in said first fuel supply conduit, an air suction line, fuel dispensing means arranged in said air suction line and connected to said first fuel supply conduit, a nozzle chamber connected to said main fuel supply nozzle, a second fuel and oil supply conduit connected to said nozzle chamber, air throttling means in said air suction line, a support shaft for said air throttling means, cam means pivotally mounted on said support shaft, and means operatively connected to said cam means for regulating the fuel and oil supply through said first conduit and said second conduit to said air suction line.

5. An apparatus comprising:
 (a) a carburetor housing;
 (b) an air suction line in said housing;
 (c) a throttle in said air suction line;
 (d) a fuel dispensing means arranged in said suction line;
 (e) a gasoline supply and an oil supply forming a fuel supply;

(f) conduit means in said housing connecting said gasoline supply and said oil supply to said dispensing means;

(g) said conduit means including a main nozzle therein, said oil supply connected to said conduit means behind the main nozzle, and a second conduit having an auxiliary nozzle therein supplying fuel to said suction line at the idling setting;

(h) and means cooperating with said throttle regulating the supply of oil to said conduit means.

6. An apparatus defined in claim 5 wherein said auxiliary nozzle is connected behind said main nozzle.

7. An apparatus defined in claim 5 wherein said auxiliary nozzle is connected ahead of said main nozzle.

References Cited by the Examiner

UNITED STATES PATENTS

| | | | |
|---|---|---|---|
| 1,087,387 | 2/14 | Lemp | 123—73 |
| 1,865,851 | 7/32 | Geiger | 261—41 |
| 1,881,256 | 10/32 | Ball et al. | 261—41 |
| 2,296,697 | 9/42 | Ball | 261—41 |
| 2,935,057 | 5/60 | Perlewitz | 123—73 |

FOREIGN PATENTS

| | | |
|---|---|---|
| 644,933 | 5/37 | Germany. |
| 678,269 | 7/39 | Germany. |

FRED E. ENGELTHALER, *Primary Examiner.*